2,823,167
STABLE VITAMIN B₁₂-CONTAINING SOLUTION

Harold L. Newmark, Lynbrook, N. Y., assignor to The Vitarine Co. Inc., New York, N. Y., a corporation of New York No Drawing. Application March 29, 1955
Serial No. 497,811

3 Claims. (Cl. 167—81)

This invention relates to a new and improved vitamin $B_{12}$ composition and a new and improved method of stabilizing vitamin $B_{12}$.

Vitamin $B_{12}$ is described in the United States Pharmacopeia, XIV. Edition, page 660 and on pages 1002–1003 of the sixth edition (published in 1952) of "The Merck Index," published by Merck & Co., Inc.

It is designated by numerous other names, which are mentioned in said page 1002.

In solid condition, cyanocobalamin is in the form of hygroscopic, dark-red crystals which are stable in solid form. One gram thereof dissolves in about 80 cc. of water at 25° C.

Said vitamin $B_{12}$ is substantially stable in solid form and in aqueous solution if dissolved without other vitamins, with maximum stability in a pH range of 4.5 to 5.

When the aqueous solution, in addition to said vitamin $B_{12}$ contains other dissolved vitamins, particularly dissolved vitamin C (ascorbic acid), $B_1$ and niacinamide, the dissolved vitamin $B_{12}$ is unstable.

In making an aqueous solution of vitamin $B_{12}$ with other vitamins, it is known to add various additional ingredients, such as buffers, preservatives, flavoring agents, etc. These additional ingredients may include liver extract which may contain iron in combined form, or mineral salts which may contain iron in combined form. The liver extract or said mineral salts are added for therapeutic purposes.

The technical literature states that solid or undissolved crystalline vitamin $B_{12}$ is stable in the presence of ferric ammonium citrate and ferric glycerophosphate, but that vitamin $B_{12}$ is incompatible with ferrous sulfate and is incompatible with vitamin C, thiamin plus niacinamide and any potent reducing substance.

According to this invention, it has been discovered that a mixed aqueous solution of vitamin $B_{12}$ and another vitamin or other vitamins, particularly a mixed aqueous solution containing vitamin $B_{12}$ and vitamin C, can be stabilized by all iron compounds or salts. The degree of stabilization of vitamin $B_{12}$ achieved depends on the particular iron compound or salt used, the concentration of iron compound or salt used, especially in comparison with the concentration of vitamin $B_{12}$ which must be stabilized; and the nature and concentrations of the other substances present in the solution. These stabilizing iron compounds or salts are used in this invention as stabilizing agents, and not as therapeutic agents, and, accordingly their concentration is below the therapeutic level. This is important and represents the essence of this invention in view of the following. Ferrous compounds in solution with vitamin $B_{12}$ cause rapid destruction of vitamin $B_{12}$ when present in therapeutic concentrations. This has been verified by several investigators. Ferrous compounds in therapeutic amounts are contra-indicated for inclusion even in solid formulations in combination with vitamin $B_{12}$ due to the deleterious effect on vitamin $B_{12}$ stability. Yet, in very low concentrations these same ferrous compounds will stabilize vitamin $B_{12}$ in the presence of other substances normally considered deleterious to vitamin $B_{12}$ stability (i. e. vitamin C, thiamin and niacinamide). These concentrations are far below the amounts of iron commonly used in preparations to supply the minimum daily therapeutic dose of iron (i. e., for hypochromic anemias, etc.). My invention is based on the discovery of this unexpected and surprising phenomenon.

These stabilizing iron compounds or salts of the invention are exemplified, without limitation thereto, by the following: iron peptonate, ferric ammonium citrate, ferric chloride, ferrous gluconate, ferric glycero phosphate, ferric sulfate, ferrous sulfate, ferric oxide, ferrous oxide, ferric or ferrous complexes of such substances as ethylene diamine tetraacetic acid and its salts.

It has also been discovered that the stabilizing effect begins at a certain minimum concentration of iron (calculated as atomic iron) in the solution; that said stabilizing effect increases up to a certain maximum concentration of iron, calculated as atomic iron, and that the stabilizing effect decreases when said maximum concentration is exceeded, also calculating the iron as atomic iron. Also, the stabilizing effect depends upon the respective iron compound, in addition to its concentration. The stabilizing effect also depends upon the dissolved ingredients other than dissolved vitamin $B_{12}$, which are dissolved in the solution.

The iron salts or compounds may have a respective therapeutic effect, but the concentration thereof, as above noted, is below the concentration for the respective therapeutic effect.

The vitamin $B_{12}$ may be admixed with the stabilzing agent in solid form, and the mixture may be dissolved in water for use.

Hence the invention includes undissolved mixtures, as well as solutions of said mixtures.

All pH measurements mentioned herein are made at 20° C.–30° C., by means of the glass electrode.

Without limitation thereto, the invention is illustrated by the following examples which show some embodiments of, and some best ways for carrying out the invention.

In the following Examples 1–9 two aqueous solutions of the following composition were used:

SOLUTION I

Each 5 cc. of this solution contained:

| | |
|---|---|
| Vitamin A | 3000 U. S. P. units. |
| Vitamin D | 1000 U. S. P. units. |
| Vitamin $B_1$ | 1.5 mg. |
| Vitamin $B_2$ | 1.2 mg. |
| Vitamin $B_{12}$ (cyanocobalamin) | 6 mcg. |
| Vitamin C (ascorbic acid) | 60 mg. |
| Niacinamide | 10 mg. |

To this solution suitable flavoring agents, such as citric acid, sugar, saccharin, propylene glycol, oil of lemon, as solubilizers for vitamin A and vitamin D, polysorbate 80, as preservative, butyl parahydroxy-benzoate or sodium benzoate and as thickener, carboxymethyl cellulose, can be added.

SOLUTION II

With the exception of the vitamin $B_{12}$ concentration, this solution had the same composition as the above described Solution I. Each 5 cc. of Solution II contained 3 mcg. of vitamin $B_{12}$ (cyanocobalamin), i. e. half of the amount present in Solution I.

These solutions were subdivided and iron peptonate or ferric ammonium citrate were added in the amounts stated hereinafter to separate portions, which were then stored at 37° C. for a period of three weeks. After this period the vitamin $B_{12}$ concentration of the solutions was assayed by the microbiological method described in U. S. P. XIV 3d Supplement. This method, as normally used, is accurate with an error of ± 10–20%, which is a reasonable error for a microbiological assay of this type.

Table 1

| No. of Example | Solution used | Stabilizer used | Amount of Stabilizer, mg./cc. | $B_{12}$ assay after storage at 37° C., mcg./5 cc. |
|---|---|---|---|---|
| 1 | I | iron peptonate | 0.1 | 7.05 |
| 2 | I | ___do___ | 1.0 | 5.46 |
| 3 | I | ___do___ | 10.0 | 6.50 |
| 4 | I | ferric ammonium citrate. | 0.1 | 4.35 |
| 5 | I | ___do___ | 1.0 | 2.53 |
| 6 | I | ___do___ | 10.0 | 2.04 |
| 7 | II | iron peptonate | 10.0 | 3.19 |
| 8 | I | none | | 1.78 |
| 9 | II | ___do___ | | 0 |

In Examples 10–12, a solution containing in each cc. the following vitamins were used:

Vitamin A (palmitate) _____ 8330 U. S. P. units.
Vitamin D _____ 2000 U. S. P. units.
Vitamin $B_1$ _____ 3.33 mg.
Vitamin $B_2$ _____ 0.83 mg.
Vitamin $B_6$ _____ 1.67 mg.
Vitamin C _____ 100 mg.
Niacinamide _____ 16.67 mg.
Pantothenic acid (as panthenol) _____ 5 mg.
Choline chloride _____ 12 mg.
Inositol _____ 7 mg.
Vitamin E (mixed tocopherols) _____ 1.67 mg.

This solution also contained suitable flavoring agents such as glycerine, propylene glycol, saccharin, raspberry flavor; as solubilizer for vitamin A, D and E: polyoxy ethylene sorbitan monolaurate, or polysorbate 80, and, as preservative: methyl parahydroxy benzoic acid and/or sodium benzoate.

The solvent used was a mixture of glycerol, propylene glycol and distilled water. To the solution thus prepared vitamin $B_{12}$ (cyanocobalamin) was added to produce a concentration of approximately 14 mcg. per cc. The resulting liquid, which is denoted hereinafter "Solution III" was subdivided into several portions, to which the stabilizers listed in Table 2 were added and which were then stored at 37° C. for three weeks. After storage the vitamin $B_{12}$ content was assayed with the following results:

Table 2

| No. of Example | Solution used | Stabilizer used | Amount of Stabilizer, mg./cc. | $B_{12}$ assay after storage at 37° C., mcg./cc. |
|---|---|---|---|---|
| 10 | III | iron peptonate | 10 | 14.65 |
| 11 | III | ferric ammonium citrate. | 10 | 11.40 |
| 12 | III | none | | 0 |

In Examples 13–19 an aqueous solution denoted hereinafter "Solution IV" was used, 1 cc. of which contained the following vitamins:

$B_1$ _____ 100 mg.
$B_2$ _____ 1 mg.
$B_6$ _____ 2 mg.
$B_{12}$ (cyanocobalamin) _____ 23 mcg.
Niacinamide _____ 100 mg.
Pantothenic acid (panthenol) _____ 10 mg.
Benzyl alcohol _____ 1.5% (based on weight/volume).

This solution was subdivided into several portions, to which the stabilizers listed in Table 3 were added. The solutions were stored at 37° C. for three weeks and after that time their vitamin $B_{12}$ content was assayed. The results are shown in the following table:

Table 3

| No. of Example | Solution used | Stabilizer used | Amount of Stabilizer, mg./cc. | $B_{12}$ assay after storage at 37° C., mcg./cc. |
|---|---|---|---|---|
| 13 | IV | iron peptonate | 0.1 | 25.2 |
| 14 | IV | ___do___ | 1.0 | 19.1 |
| 15 | IV | ___do___ | 10.0 | 18.1 |
| 16 | IV | iron ammonium citrate. | 0.1 | 19.9 |
| 17 | IV | ___do___ | 1.0 | 16.5 |
| 18 | IV | ___do___ | 10.0 | 14.8 |
| 19 | IV | none | | 0 |

In Examples 20–22, a solution denoted hereinafter "Solution V" was used, which contained the following ingredients in each one cc.:

Vitamin $B_1$ _____ 100 mg.
Vitamin $B_2$ _____ 1 mg.
Vitamin $B_6$ _____ 2 mg.
Niacinamide _____ 50 mg.
Panthenol _____ 10 mg.
Vitamin $B_{12}$ (cyanocobalamin) _____ 15 mcg.
Vitamin C _____ 100 mg.
Buffers, preservatives, etc _____ 6% (based on weight/volume).

Distilled water q. s.

As buffers and preservatives, sodium citrate (2% w./v.), benzyl alcohol (1% w./v.) and gentisic acid ethanolamide (3% w./v.) were present in the solution. The initial assay of the solution was 16.1 mcgm. of vitamin $B_{12}$ per cc.

EXAMPLE 20

To a portion of Solution V, 0.5 mg./cc. of iron peptonate was added and resulting solution was stored at 37° C. for three weeks. After such storage, the solution showed a vitamin $B_{12}$ assay of 15 mcg./cc. Since this solution originally had 15 micrograms of cynocobalamin per cc., the microbiological assay showed a concentration of 100% of potency.

EXAMPLE 21

To a portion of Solution V, 12 mg./cc. of iron peptonate were added and the solution was then stored at 37° C. for three weeks. After storage, a vitamin $B_{12}$ assay of 7 mg./cc. was found. Hence in this case, the value of the cyanocobalamin found in the microbiological assay was substantially 50% of the original concentration.

EXAMPLE 22

After storage at 37° C. for three weeks without any addition, a portion of Solution V showed a vitamin $B_{12}$ assay of less than 1 mcg./cc.

In the preceding Examples 20–22 there is a demonstration of the decrease in stabilization of vitamin $B_{12}$ achieved when the concentration of iron compound more nearly approaches therapeutic levels. Solution V, which contains ascorbic acid, thiamin and niacinamide, etc., is normally considered a poor medium for vitamin $B_{12}$ stability, a view verified by Examples 22. Addition of a small amount of iron compound (0.5 mg./cc. of iron peptonate) as in Example 20, produced a solution of good vitamin $B_{12}$ stability. A high concentration of the same iron compound, as used in Example 21, showed a sharply decreased vitamin $B_{12}$ stability in comparison with Example 20. It is to be noted that the atomic iron concentration of Example 21 was 2 mg./cc. The normal human dose of this preparation is 1 cc. Therefore, this preparation supplies one-fifth the minimum daily adult iron requirement per dose. Yet, this concentration of iron, in relation to the other ingredients, produced a less satisfactory stabilization of vitamin $B_{12}$ than the much smaller amount used in Example 20. This serves to demonstrate that the peak of vitamin $B_{12}$ stabilization is achieved with the addition of an iron compound in an amount far less than therapeutic amounts.

EXAMPLE 23

A starting solution corresponding to that used in the above Examples 10–12 was prepared, containing in each cc. the following vitamins:

| | |
|---|---|
| Vitamin A (palmitate) | 8330 U. S. P. units. |
| Vitamin D | 2000 U. S. P. units. |
| Vitamin $B_1$ | 3.33 mg. |
| Vitamin $B_2$ | 0.83 mg. |
| Vitamin $B_6$ | 1.67 mg. |
| Vitamin C | 100 mg. |
| Niacinamide | 16.67 mg. |
| Pantothenic acid (as panthenol) | 5 mg. |
| Choline chloride | 12 mg. |
| Inositol | 7 mg. |
| Vitamin E (mixed tocopherols) | 1.67 mg. |

The solvent was a mixture of glycerol, propylene glycol and distilled water.

The resulting solution was divided into 3 portions, and to these portions vitamin $B_{12}$ was added as follows:

(a) To the first portion, 10 mcg. per cc. of vitamin $B_{12}$ activity, type S (Merck) was added, i. e. vitamin $B_{12}$ consisting of a semi-refined $B_{12}$ fermentation product, whose activity is due entirely to cyanocobalamin and which is blended with inert ingredients suitable for bulk handling to a concentration of 1 mg. vitamin $B_{12}$ activity per gram of gross weight.

(b) To the second portion, 10 mcg. per cc. of vitamin $B_{12}$ activity was added, in the form of oral grade solids (Calco), consisting of a concentrate in semi-purified state of $B_{12}$ activity components obtained from microbiological fermentation, suitable for oral use and blended with inert ingredients to an activity of 1 mg. of $B_{12}$ per gram of gross weight. This vitamin $B_{12}$ activity is composed of approximately 75–80% of hydroxy cobalamin, the balance being predominantly cyanocobalamin.

(c) To the third portion, 10 mcg. per cc. of vitamin $B_{12}$ activity was added in the form of U. S. P. crystalline cyanocobalamin.

Each of these portions (a), (b) and (c), was again subdivided into 3 parts and iron peptonate was added to some, in the amounts listed below. Assays were taken at the time of preparation and after storage for 3 weeks at 37° C. The results were as follows:

Table 4

| Portion | Original assay, Vitamin $B_{12}$, mcg./cc. | Assays after 3 weeks' storage at 37° with— | | |
|---|---|---|---|---|
| | | 0.0 mg./cc. of iron peptonate added | 0.1 mg./cc. of iron peptonate added | 1 mg./cc. of iron peptonate added |
| | | | | mcg./cc. |
| Portion (a) | 10.4 | 0 | 0 | 8.2 |
| Portion (b) | 8.7 | 0 | 0 | 9.1 |
| Portion (c) | 11.4 | 0 | 0 | 9.7 |

The above data show that 1 mg. per cc. of iron peptonate stabilizes each of the three types of vitamin $B_{12}$, equally well in the preparation herein described.

EXAMPLE 24

A multivitamin solution containing in each cc. the following ingredients, was prepared:

| | |
|---|---|
| Vitamin A (palmitate) | 8300 U. S. P. units. |
| Vitamin D | 2000 U. S. P. units. |
| Vitamin $B_1$ | 3.33 mg. |
| Vitamin $B_2$ | 0.83 mg. |
| Vitamin $B_6$ | 1.67 mg. |
| Vitamin C | 100 mg. |
| Niacinamide | 16.67 mg. |
| Pantothenic acid (as panthenol) | 5 mg. |
| Vitamin E (mixed tocopherols) | 1.67 mg. |

In this preparation, which is similar to that used in the above Examples 10–12, with the omission of choline chloride and inositol, the same flavoring and solvent as in Examples 10–12 were used.

To this preparation vitamin $B_{12}$ (cyanocobalamin) was added to produce a concentration of about 4 mcg./cc. This solution denoted hereinafter Solution V, was divided into 13 portions and to these portions iron compounds were added, as described below. After storage for 3 weeks at 37° C. the vitamin $B_{12}$ was assayed, and the following results were obtained:

Table 5

| Stabilizer used (if any) | Amount of Stabilizer, mg./cc. | Amount of Fe per cc., mcg./cc. | $B_{12}$ assay after 3 weeks' storage at 37° C., mcg./cc. |
|---|---|---|---|
| (a) none | | 0 | 0 |
| (b) Ferric chloride | 1 | 200 | 2.24 |
| (c) Ferric chloride with beef peptone | 1, 2 | 200 | 2.23 |
| (d) ferrous gluconate | 1 | 116 | 1.89 |
| (e) Ferrous gluconate with beef peptone | 1 | 116 | 1.80 |
| (f) ferric glycero phosphate | 1 | 180 | 2.84 |
| (g) ferric ammonium citrate | 1 | 160 | 2.24 |
| (h) ferric sulfate | 1 | 280 | 3.35 |
| (i) ferrous sulfate | 1 | 200 | 2.76 |
| (j) iron peptonate | 0.01 | 1.6 | 0 |
| (k) iron peptonate | 0.1 | 16 | 0 |
| (l) iron peptonate | 1.0 | 160 | 1.38 |
| (m) iron peptonate | 10.0 | 1,600 | 4.18 |

The above results demonstrate that all of the iron compounds used have a stabilization effect on vitamin $B_{12}$ in this preparation, which contains ascorbic acid as well as thiamin, niacinamide, and other vitamins. Where no stablizer is used the vitamin $B_{12}$ decomposes rapidly. The results with iron peptonate ("j" through "m") indicate that a minimum amount of iron is required to achieve vitamin $B_{12}$ stabilization in this preparation, and that this stabilization effect increases as the amount of iron increases wthin the range of concentrations tested in this experiment. Generally, with only a few exceptions, the above data indicate an increasing stabilization of vitamin $B_{12}$ in this preparation as the iron concentration increases within the limited range of concentrations tested. This is true regardless of the type of iron compound used.

In certain types of multivitamin preparations it may be deemed inadvisable to add appreciable amounts of iron compounds which yield appreciable amounts of ferric or ferrous ions in solution (e. g., ferric chloride). This is due to the known adverse effect of ferric ions on the stability of certain vitamins (e. g., vitamin A, pyridoxine hydrochloride, etc.). However, it is also well known that iron may still be present in such solutions if present in the form of complexes or chelates. These bind ferric and/or ferrous ions into soluble forms which are only very slightly dissociated into the ionic forms of iron. Several of the stabilizers used in the above examples are illustrations of such complexes (e. g., ferric ammonium citrate, iron peptonate, etc.). One of the most effective of such chelating agents is ethylene diamine tetra acetic acid and its salts (called EDTA or versene (R)). So effective is this agent that it has been recommended for use as a stabilizer for B complex, ascorbic acid, and other vitamin preparations to prevent the breakdown of these vitamins in the presence of ionic iron. It is often used as a stabilizer in such preparatons because of ths property. However, even in the presence of EDTA, iron compounds will still stabilize vitamin $B_{12}$ in multivitamin preparations. This unexpected and surprising effect is of great practical importance, since it enables the use of iron compounds in multivitamin preparations to stabilize vitamin $B_{12}$ and, yet, the iron is so effectively combined in the chelate form that there is excellent stability of the other vitamins in the preparation. This is illustrated in the following Example 25.

EXAMPLE 25

A solution identical with the composition used in Solution I and II was prepared, except that the vitamin $B_{12}$ (cyanocobalamin) was initially 4.0 mcgm./5 cc. This solution which is denoted hereinafter as Solution VII, was subdivided into several portions and the stabilizers and EDTA added as listed in Table 6. After storage for 3 weeks at 37° C. the vitamin $B_{12}$ was assayed and the following results were obtained:

Table 6

| Portion | Stabilizer used (if any) | Amt. of Stabilizer, mg./cc. | Amt. of Fe per cc., mg./cc. | Amt. of EDTA, mg./cc. | $B_{12}$ assay after 3 weeks at 37° C., mcgm./5 cc. |
|---|---|---|---|---|---|
| a | None | 0 | 0 | 0 | 1.1 |
| b | do | 0 | 0 | 1 | 0.8 |
| c | Ferric Chloride Hexahydrate. | 0.5 | 0.1 | 1 | 3.6 |
| d | do | 0.5 | 0.1 | 0 | 3.7 |
| e | Iron Peptonate | 0.6 | 0.1 | 1 | 3.7 |
| f | do | 0.6 | 0.1 | 0 | 4.3 |
| g | Ferric Ammonium Citrate. | 0.7 | 0.1 | 1 | 4.1 |
| h | do | 0.7 | 0.1 | 0 | 4.0 |

From the above data in Table 6 is can be seen that the vitamin $B_{12}$ in this preparation (which contains vitamins A, C, D, thiamin, niacinamide, and other vitamins) is unstable without the addition of any iron compound. Addition of any of the three types of iron compound used (completely ionized as ferric chloride, partly ionized as ferric ammonium citrate, or non-ionic as iron peptonate) will materially aid the stability of vitamin $B_{12}$. Addition of EDTA without iron (portion b) does not stabilize the preparation. The simultaneous addition of an iron compound with EDTA does not appreciably reduce the vitamin $B_{12}$ stabilizing effect of the iron compounds. It is to be noted that the amounts of EDTA added in each case are in excess of that required to chelate the entire amount of iron added. In portions (c), (e), and (g) the EDTA added was sufficient to protect the other vitamins from iron-produced breakdown, so that no appreciable decrease of potencies of vitamin A, thiamin, pyridoxin, ascorbic acid, riboflavin, and other vitamins took place. The tests previously stated herein apply to solutions whose solvent includes water, and in which the original concentration of the dissolved ascorbic acid is greater than the original concentration of the dissolved cyanocobalamin. In the tested solutions, the dissolved ascorbic acid was in sufficient concentration to produce decomposition of the dissolved cyanocobalamin, thus resulting in substantial or complete destruction of the cyanocobalamin, when determined by microbiological assay at the end of a storage period of three weeks at 37° C., in the absence of a suitable proportion of added stabilizing agent. When the solution had a stabilizing iron compound in suitable stabilizing concentration and the solution was tested by said microbiological assay at the end of said storage period of three weeks at 37° C., the value of the cyanocobalamin which was determined by said microbiological assay, was at least one-half of the original concentration. Alternatively stated, the value of the cyanocobalamin which was determined by said microbiological assay, in the presence of a suitable concentration of the stabilizing iron compound, was at least twice the lower value in the absence of such suitable concentration.

The solutions to which a stabilizer according to the present invention is added have a pH in the range of 3 to 7. For example, the pH of the above described solutions is as follows:

Solution I _____ 5.0
Solution II _____ 5.2
Solution III _____ 5.1
Solution IV _____ 4.3
Solution V _____ 4.5
Solution VI _____ 5.0
Solution VII _____ 5.0

It will be understood from the above that the present invention is applicable to all forms of vitamin $B_{12}$, such as for example crystalline cyanocobalamin, non-crystalline semi-refined cyanocobalamin and semi-refined mixtures of cyanocobalamin and hydroxycobalamins.

It will be also understood that the invention is not limited to the specific materials, proportions, steps and other details specifically described above and can be carried out with various modifications without departing from the scope of the invention, as defined in the appended claims.

The term "minimum daily adult requirement" of iron is used in the present application in conformity with the definition in Federal Register of November 22, 1941, title 21, Food and Drugs, chapter I, part 125, page 5923, paragraph 52.

What is claimed is:

1. An aqueous solution which includes dissolved cyanocobalamin and dissolved ascorbic acid, the original concentration of said ascorbic acid being greater than the original concentration of said cyanocobalamin, said dissolved ascorbic acid being in sufficient original concentration to induce decomposition of said dissolved cyanocobalamin in a cyanocobalamin-destroying reaction, in the absence of a stabilizing agent; said solution having an added stabilizing agent dissolved therein, said stabilizing agent being an iron compound, said iron compound being soluble and substantially non-toxic in the concentration present in said solution, the elemental iron content in said stabilizing iron compound being in the range of substantially seventeen micrograms to seventeen-hundred micrograms per cubic centimeter, said selected concentration of said iron compound being below a daily dosage of ten milligrams of elemental iron.

2. A solution according to claim 1, said solution having an original concentration of dissolved cyanocobalamin of at least six-tenths of a microgram per cubic centimeter.

3. A solution according to claim 2, the original concentration of the dissolved ascorbic acid being in excess of one thousand times the original concentration of the cyanocobalamin.

References Cited in the file of this patent
UNITED STATES PATENTS 2,584,627    Skeggs _____ Feb. 5, 1952
2,695,860    Weidenheimer _____ Nov. 30, 1954

OTHER REFERENCES

J. of the Am. Pharm. Asso., Prac. Pharm. Ed., vol. 12, December 1951, page 768.
Howard: Mod. Drug. Encycl. 5th Ed., 1952, p. 849.
Modern Drugs (1), March 1954, p. 814.
Modern Drugs (2), January 1951, pp. 528, 529.
Modern Drugs (3), November 1954, pp. 1210, 1212.
Seeberg: Science, vol. 119, Apr. 30, 1954, pp. 608, 609.

UNITED STATES PATENT OFFICE

CERTIFICATE OF CORRECTION

Patent No. 2,823,167                                                                    February 11, 1958

Harold L. Newmark

It is hereby certified that error appears in the printed specification of the above numbered patent requiring correction and that the said Letters Patent should read as corrected below.

Column 2, line 53, after "lemon" strike out the comma and insert instead a semi-colon; line 54, after "80" strike out the comma and insert instead a semi-colon; line 56, after "benzoate" insert a semi-colon; line 72, after "type." insert -- The results are indicated in Table I. --; column 3, lines 16 and 17, for "containing in each cc. the following vitamins were used:" read -- was used, with the following composition in each one cc.: --; column 4, line 47, for "7 mg./cc." read -- 7 mcg/cc. --; line 61, for "Examples" read -- Example --; column 6, line 7, for "Solution V" read -- Solution VI --.

Signed and sealed this 27th day of May 1958.

(SEAL)
Attest:

KARL H. AXLINE
Attesting Officer

ROBERT C. WATSON
                                                                   Commissioner of Patents